United States Patent [19]
Azzara et al.

[11] Patent Number: 5,151,236
[45] Date of Patent: Sep. 29, 1992

[54] METHOD FOR FORMING CONVEX NON-EXTRACTABLE FORMED PIECES MADE OF A COMPOSITE MATERIAL

[75] Inventors: Sauveur A. Azzara, Sartrouville; Hervé G. F. Coutant, Le Chesnay, both of France

[73] Assignee: Aerospatiale Societe Nationale Industrielle, Paris, France

[21] Appl. No.: 621,241

[22] Filed: Nov. 30, 1990

[30] Foreign Application Priority Data

Dec. 5, 1989 [FR] France ............... 89 16058

[51] Int. Cl.⁵ .............................................. B29C 43/18
[52] U.S. Cl. .................................... 264/257; 264/315
[58] Field of Search ............... 264/257, 258, 314, 313, 264/317, 315

[56] References Cited

U.S. PATENT DOCUMENTS

| | | | |
|---|---|---|---|
| 4,126,659 | 11/1978 | Blad | 264/257 |
| 4,657,717 | 4/1987 | Cattanach | 264/314 |
| 4,808,362 | 2/1989 | Freeman | 264/314 |
| 4,816,203 | 3/1989 | Son-Kung | 264/257 |

FOREIGN PATENT DOCUMENTS

| | | |
|---|---|---|
| 2737790 | 3/1978 | Fed. Rep. of Germany . |
| 999306 | 1/1952 | France . |
| 1436023 | 3/1966 | France . |
| 1504703 | 12/1967 | France . |
| 1505086 | 12/1967 | France . |
| 2065051 | 7/1971 | France . |
| 2255519 | 7/1975 | France . |
| 2364102 | 4/1978 | France . |
| 2637536 | 4/1990 | France . |
| 2635484 | 4/1991 | France . |

*Primary Examiner*—Tim Heitbrink

[57] ABSTRACT

In order to form shaped convex non-extractable pieces made of a composite material, a partially polymerized (stage B) preform strip (10) is placed in a forming tool (16) along a cylindrical surface having one rectilinear generator and one convex directrix curve whose shape coincides with the shape of the piece to be embodied. The particular section of the piece is obtained with the aid of an inflatable bladder (22) pressing the preform strip against a forming die (24). In this way, the area contractions are kept to a minimum, which avoids may undulations of the fibers and any falling off of the mechanical characteristics of the pieces which may accordingly arise.

9 Claims, 4 Drawing Sheets

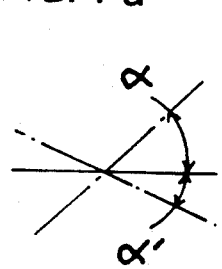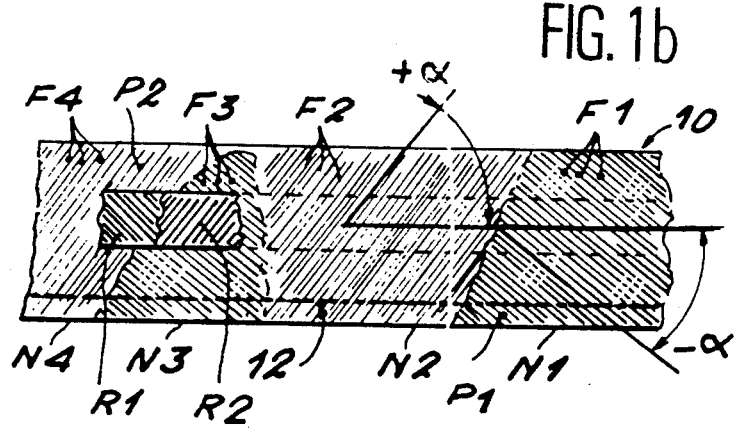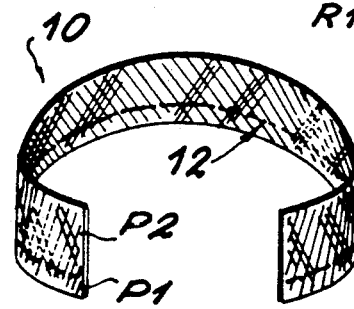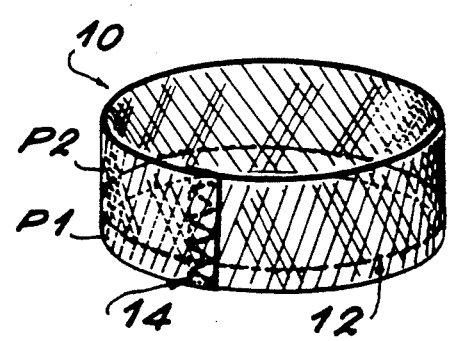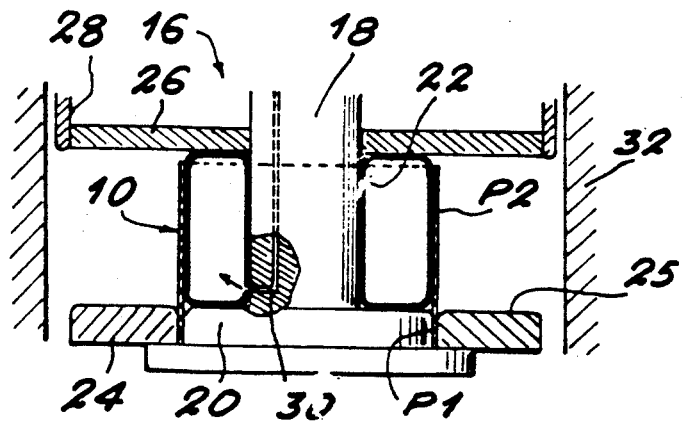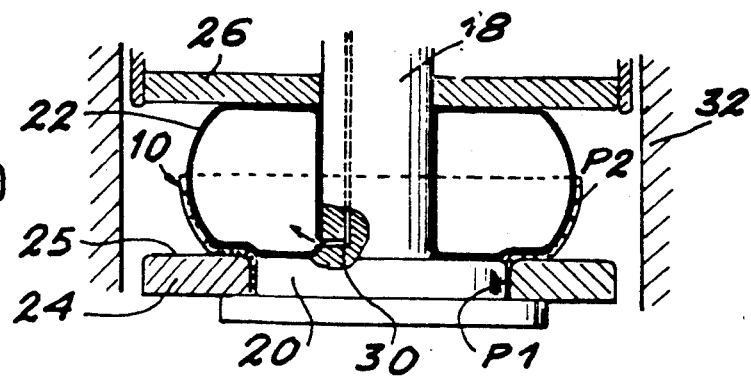

METHOD FOR FORMING CONVEX NON-EXTRACTABLE FORMED PIECES MADE OF A COMPOSITE MATERIAL

FIELD OF THE INVENTION

The invention concerns a method to form non-extractable convex formed pieces made of a composite material.

BACKGROUND OF THE INVENTION

Composite materials are more and more frequently used in many industrial applications, such as in aeronautical, automobile and rail transport applications. The particular structure of these materials enables them to embody pieces with extremely varied shapes and provide these pieces with the desired characteristics by means of a suitable orientation of the fibers they contain.

The method of the invention is in particular applicable to the production of aeronautical structures made of a composite material, these structures being extremely delicate to embody. These structures are pieces with strong curves having non-extractable shapes, such as aircraft fuselage frames, door framing stiffeners, support reinforcements disposed at the edges of holes, etc.

In order to embody such pieces, one first solution consists of producing a rectangular preform plate by draping edge to edge and in successive sheets strips of unidirectional fibers or fibrous fabrics impregnated with resin. Then a preform is cut from this plate, this preform having the shape of the piece to be embodied. So as to give this preform the section of the piece, it is subjected to one or several forming operations during which the uneven sections of the piece are shaped with a aid of a suitable tool.

This known method has a large number of drawbacks. Accordingly, the operation consists of cutting a preform having the shape of the piece to be embodied from a large preform plate resulting in a high discard rate, which increases the dimensions of the piece.

In addition, this method involves embodying a piece in which the distribution of the fibers is totally anisotropic. This in particular complicates the task of the engineering office which needs to take into account when designing the piece the evolution of the mechanical characteristics arising from this distribution of the fibers. Moreover, the unhomogeneous distribution of the fibers in the preform strip, as well as the carrying out of forming operations on a plain strip, result in area contractions and elongations unable to be accepted by the fibrous products in certain zones, which results in the formation of folds, etc. Finally, this method is a long method and cumbersome to implement.

In one variant of this known production method, instead of embodying by draping a rectangular preform plate and then of cutting a preform from this plate, a preform is produced directly by draping whose shape approximates the contour of the piece to be embodied.

If this technique makes it possible to considerably reduce the discard rate, it significantly increases the draping time and does not resolve any of the aforementioned drawbacks.

In the document FR-A-88 10984, another method is described making it possible to embody a flat preform having the shape of the piece desired to be obtained from a rectilinear preform strip cut from a larger flat preform plate. This method consists of curving inwards the preform strip inside its plane, for example with the aid of a conical roller machine. Thus, a piece is obtained in which the distribution of the fibers is homogeneous over its entire length with a discard rate of virtually nil.

However, so as to provide this piece with its definitive section, the latter needs to be subsequently subjected to one or more forming operations. During these operations, the sections internal to the radius of curvature of the piece are shaped by the apparent elongation of the evolute of the fibers which are then stretched. On the other hand, the sections outside the radius of curvature and previously deformed with the aid of the conical roller machine are shaped by the apparent area contraction of the evolute of the fibers outside the radius of curvature, which are then compressed.

In pieces produced in this way, these compressed fibers singe owing to the friction stresses existing between them and the reduction of the evolute is absorbed by the undulation of the fibers. The undulated fibers then lose all their stiffness and resistance characteristics in the stratified piece, which then more strongly stresses the binding resin. This results in a falling off of the characteristics, this proving to considerably damage structure pieces.

In addition, this method requires, like the preceding methods, a relatively large number of stages, thus increasing the duration and cost of the method.

SUMMARY OF THE INVENTION

The precise object of the invention is to provide a new method for forming formed pieces made of a composite material making it possible, like the method described in the document FR-A-88 10984, to virtually reduce to zero the discard rate and to embody a piece in which the fibers are distributed homogeneously and controlled, whilst limiting to an absolute minimum the elongations so as to avoid any area contractions at the time of forming, this method further making it possible to reduce as far as possible the stages, as well as the production time of such a piece.

To this effect, the present invention proposes a method for the forming of non-extractable convex pieces made of a composite material from a plain preform strip including fibers preimpregnated with resin and orientated along at least two different non-longitudinal directions, wherein said method consists of:

placing the preform strip in a forming tool along a cylindrical surface having one rectilinear generator and one convex directrix curve which has the shape of the piece to be embodied, this tool including a forming die having a formed surface which has a complementary section of the piece to be embodied, and applying by pressure the preform strip against the formed surface of the forming die.

Preferably, at least the preform strip is partly applied against the formed surface with the aid of an inflatable bladder placed on the other side of the preform strip with respect to the formed surface opposite at least one section of this strip to be deformed.

In this case, it is possible to apply the preform strip against the formed surface, either by inflating the inflatable bladder, or by deforming the bladder, after having firstly inflated it, with the aid of a mobile member of the forming tool.

So as to enable the preform strip to undergo deformations without it breaking up during forming, this strip is preferably compacted by placing it in a partial vacuum or by rolling it between press rollers before being placed in the forming tool. This mechanical action, associated with the coherence characteristic of the preform strip, creates cohesive links which ensure the proper behaviour of this strip during forming.

In the particular case where the piece to be embodied is a closed frame, the two extremities of the preform strip are interconnected with the aid of at least one seam, preferably zigzag, before placing this strip in the forming tool;

The preform strip generally includes at least one portion not to be deformed, which corresponds in most cases to the internal portion of the piece to be embodied. So as to isolate this portion with respect to the rest of the piece, it is possible to maintain it by mechanical clamping in the forming tool when applying the preform strip against the formed surface, or to embody at least one longitudinal seam at the limit of this portion not to be deformed, or finally to add to this portion at least one additional lap of fibers orientated longitudinally with respect to this preform strip. The seam or additional lap are then placed before the preform strip is placed in the forming tool.

BRIEF DESCRIPTION OF THE DRAWINGS

Various examples for implementing the forming method of the invention are described hereafter, these examples being in no way restrictive, with reference to the accompanying drawings in which:

FIG. 1a diagrammatically represents a plain preform strip suitable for being shaped by means of the method of the invention, FIG. 1b shows that the fibers of two successive laps of the preform strip may assume different crossed orientations, FIGS. 2 and 3 show in perspective the respective shapes assumed by this preform strip when the latter is placed in the forming tool in the case where the piece to be produced is an open frame and in the case where the frame is a closed frame, FIGS. 4a to 4c are cutaway views diagrammatically illustrating the successive phases of a first stage for implementing a forming tool designed in such a way as to give the finished piece a U-shaped section.

DETAILED DESCRIPTION OF THE PREFERRED EMBODIMENTS

Figure 4C:
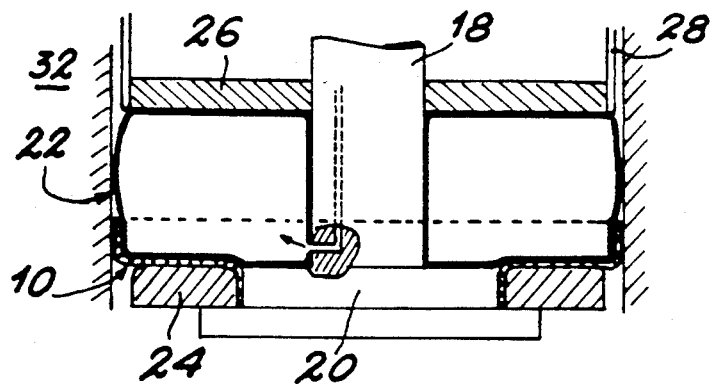

As diagrammatically shown on FIG. 1, the embodiment in accordance with the invention of a formed convex non-extractable piece starts by producing a plain rectangular preform strip 10. This preform strip 10 may be embodied directly with the desired dimensions or obtained by cutting from a larger preform plate. In either case, there are virtually no discards.

The strip or the preform plate is normally obtained by draping by superimposing a certain number of laps N1, N2, N3, N4 and local interlap reinforcements R1, R2, etc., in a deformable zone and having a crossed structure formed on non-woven fibers F1, F2, F3, F4, etc., disposed in each lap along a specific direction, the direction differing from one lap to another. As shown on FIG. 1, the fibers, such as F1 and F2 or F3 and F4 of two successive laps N1, N2 or N3, N4, are preferably orientated from a given positive angle but in the opposite direction with respect to the longitudinal direction of the preform strip 10. It is also possible to provide a different angle of orientation, for example $\alpha$ and $\alpha'$ (FIG. 1a), but in the opposite direction, from one lap to another so as to obtain an asymmetrical crossing of the fibers. The value of this angle $\alpha$, which must strictly not be nil, is determined according to the mechanical characteristics of the piece it is desired to produce. These characteristics also determine the number of laps constituting the preform strip 10 and the nature of the material constituting the fibers F1, F2, etc., these fibers normally being of the same type. By way of example being in no way restrictive, the angle may be about 45° and the fibers F1, F2, etc., may be carbon, glass, Kevlar (trade name for an aromatic polyamide), etc.

The fibers constituting the various laps of the preform strip 10 are preimpregnated with resin, this resin normally being a polymerizable resin. When draping is carried out, the resin is at a given polymerization stage which leaves the preform strip a sufficient adherence characteristic enabling it to be draped and handled.

In one embodiment variant (not shown), the laps of the non-woven fibers are replaced by preimpregnated fiber fabrics orientated along directions more or less $\alpha$, as in the previously described example.

So that it may undergo the deformations linked to forming without it breaking up, the preform strip 10 thus obtained is mechanically compacted by applying pressure on its opposing faces. This compacting may in particular be obtained by placing the preform strip in a partial vacuum or by rolling the latter between pressing rollers. The mechanical compression effect added to the adherence characteristic of the product creates cohesive links which contribute in providing the preform strip with resistance during forming.

As shown at 12 on FIG. 1, one or several longitudinal seam lines may further be embodied on the preform strip 10 at predetermined locations which make it possible to locally isolate one portion P1 of the strip, which must not be deformed during forming, from the rest P2 of the strip. This zone may also be reinforced by strips of unidirectional fibers disposed longitudinally with respect to the strip prior to the forming sequence.

In the example shown, which corresponds to the production of a piece with a U-shaped section, the isolated portion P1 is found in the bottom portion of FIG. 1 below the seam line 12 and it corresponds, when the piece is completed, to one internal wing AI (FIGS. 7 and 8) of the piece. All the rest P2 of the strip 10 shall at the time of forming undergo a deformation resulting in an apparent increase of its diameter, the elongation, however, being limited to the strict minimum, as shall be seen subsequently.

The seam line 12 is embodied with a yarn of the same type as the fibers F1, F2, etc., forming the preform strip 10.

In one embodiment variant (not shown), the isolating of the portions P1 of the preform strip 10 not to be deformed is obtained, not by embodying one or several seam lines as shown on FIG. 1, but by placing on the corresponding portion of the preform strip one or several strips of fibers orientated longitudinally with respect to the preform strip. The fibers of these additional laps, which are of the same type as the fibers F1, F2, etc., behave as a hoop and prevent the deformation of the corresponding portion P1 at the time of the subsequent forming operation.

The same result may also be obtained without any seam line and without any additional band of longitudinal fibers by carrying out a mechanical flanging of the corresponding portion of the preform strip when the latter is placed in the forming tool. In certain cases, this latter solution may be combined with one of the previous solutions.

As shown diagrammatically in detail on FIG. 2, when the preform strip 10 is used for the production of a non-closed piece, this strip is placed directly into a suitable forming tool along a cylindrical surface having one rectilinear generator, as well as one convex directrix curve which has the shape of the piece to be embodied. The shape of this convex directrix curve may therefore be any and include in particular rectilinear portions, as well as variable radius bent inward portions. Most frequently, the generator of the cylindrical surface is then perpendicular to the directrix curve, as shown on FIG. 2.

In the case shown on FIG. 3 where the piece to be embodied is a closed piece, such as a closed frame of an aircraft fuselage, the two extremities of the preform strip 10 are interconnected with the aid of one or several zigzag seams 14. These seams are made with yarns compatible with the method for polymerizing the final piece.

As in the case of a non-closed frame, the preform strip is then placed in a suitable forming tool along a cylindrical surface having one rectilinear generator and one convex directrix curve having the shape of the piece to be embodied.

FIGS. 4a to 4c illustrate one first stage for using a forming tool adapted for the production of a piece having a U-shaped section.

The forming tool, generally denoted by the reference 16, includes an internal dimensionally stable support piece 18 whose external surface is a cylindrical surface having a directrix curve parallel to the internal surface of the piece to be embodied.

Around the bottom portion of the internal support piece 18, a shim is placed with a height equal to the height of the portion P1 of the preform strip 10. An inflatable bladder 22, initially deflated, is placed above the shim 20 around the support piece 18. The thickness of the shim 20 corresponds to the thickness of the bladder 22 in its deflated state. The preform strip 10 is placed as described previously around the shim 20 and the inflatable bladder 22.

A forming die 24 is placed around the preform strip 10 and at the level of the shim 20, this die being preferably pressed against the shim 20 so as to maintain the portion P1 at the time of forming. The upper face of the die 24, as well as its internal and external peripheral edges, define a formed surface 25 complementary to one of the faces of the formed piece to be embodied. More precisely, this formed surface has a U-shaped convex section complementary to the internal concave of the U sectionally formed by the piece to be embodied.

The forming tool 16 shown on FIGS. 4a to 4c further includes a fixed horizontal plate 26 placed around the internal support piece 18 immediately above the upper edges of the preform strip 10 and the inflatable bladder 22.

In practice, the preform strip 10 is firstly placed inside the forming die 24, then the bladder 24 is positioned, as well as the pieces 18, 20 and 26 which block this bladder on three sides.

The forming tool also includes a mobile hoop 28 suitable for moving vertically downwards and initially retracted above the lower face of the plate 26. This hoop 28 is situated slightly beyond the outer peripheral edge of the forming die 24 and may either have a shape complementary to the latter, or be adapted for moving along its outer edge.

Of course, some of the elements of the forming tool 16 are embodied by several pieces so as to enable this tool to be assembled and disassembled and allow for the placing of the preform strip and removal of the formed piece.

In the first stage successively shown by FIGS. 4a to 4c, the forming of the piece is obtained by inflating the bladder 22. To this effect, this bladder is connected to a compressed air source (not shown) via a pipe 30.

When the bladder 22 begins to be inflated (FIG. 4b), this bladder is blocked on three sides by the internal support piece 18, the shim 20 and the upper plate 26. As a result, the inflation of the bladder is expressed by the latter being deformed outwardly, which has the effect of progressively cladding the portion P2 of the preform strip 10 situated above the portion P1 against the plain upper face of the forming die 24. The preform strip 10 is progressively brought to the desired section via apparent elongation, the fibers then assuming a trajectory identical to the one obtained by curving a preform strip inside its plane with the aid of conical rollers, as described in the document FR-A-88 10984.

It is interesting to observe that, at the end of inflating the bladder 22 (FIG. 4c), the upper portion of the preform strip 10 intended to form the outer wing AE (FIGS. 7 and 8) of the formed piece is found folded back upwards and cladded against the internal cylindrical face of an external support piece 32 so that the elongation of this section only exceeds the final elongation of the outer wing by the thickness of the hoop 28.

Figure 5A:
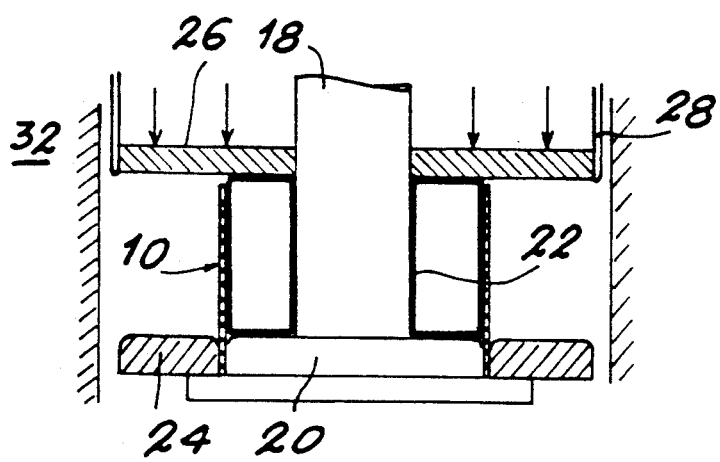
FIGS. 5a to 5c are cutaway views similar to FIGS. 4a to 4c and illustrating one embodiment variant of the first stage.
Figure 5B:
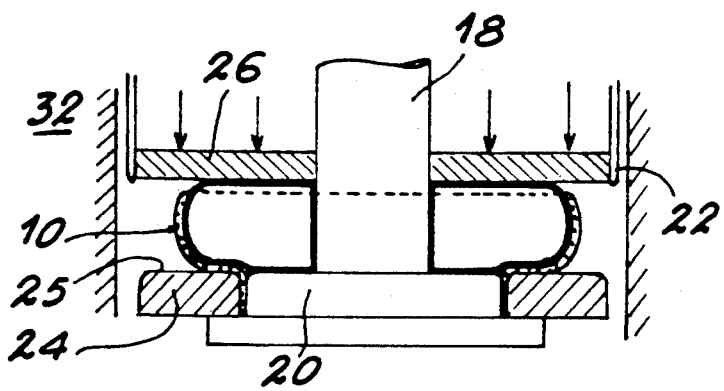
Figure 5C:
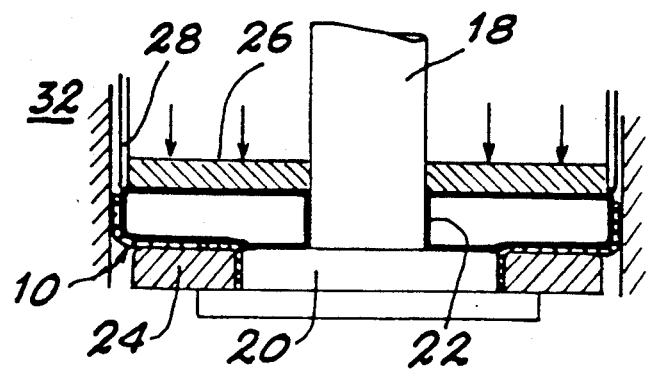

FIGS. 5a to 5c show a variant for implementing the first stage of the forming method of the invention. In this variant, the forming tool also includes an internal support piece 18, a shim 20, an inflatable bladder 22, a forming die 24, an upper plate 26, a mobile hoop 28 and an external support piece 32. However, the bladder 22 is inflated before the start of forming and the plate 26, instead of being fixed, is mobile so as to be able to move downwards, thus drawing close to the forming die 24.

Forming is then effected, not longer by inflating the bladder 22, but by the plate 26 moving downwards, as successively shown on FIGS. 5a to 5c. At the end of this first stage, the central portion of the strip 10 is cladded onto the upper face of the forming die 24 and the upper edge of the strip 10 is orientated upwards and cladded against the internal surface of the support piece 32 (FIG. 5c).

Once the first forming stage has ended, the preform strip 10 thus has an approximately Z-shaped section, irrespective of the device used to arrive at this shape. So as to obtain a piece having a U-shaped section, it is thus necessary during a second stage to turn downwards the upper edge of the preform strip 10, as shown on FIGS. 4c and 5c.

Figure 6A:
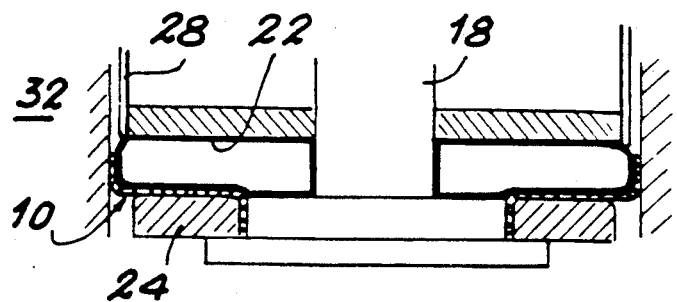
FIGS. 6a to 6c are views similar to FIGS. 4a to 4c and illustrating a second and final stage for forming a formed piece with a U-shaped section.
Figure 6B:
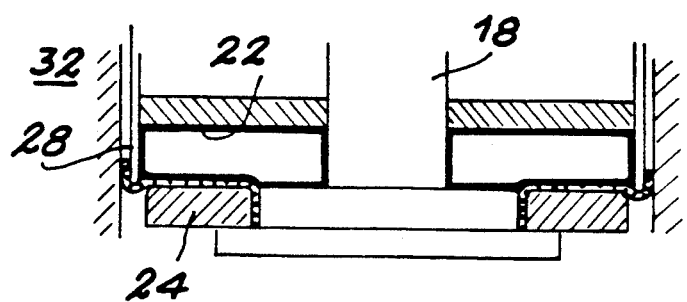
Figure 6C:
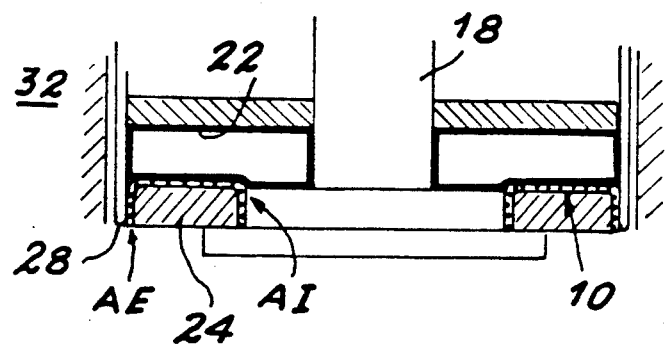

In the embodiment shown on FIGS. 6a to 6c, this operation is effected by moving the mobile hoop 28 downwards after having deflated, at least partially, the bladder 22. As shown by the figures, the mobile hoop 28 then passes inside the upper portion of the preform strip 10 which is cladded against the external support piece 32 so that it comes into contact with the preform strip in the hollow formed between this upper portion and the central portion cladded onto the upper face of the forming die 24. Then the upper portion of the strip is gradually turned downwards without the apparent evolute ever increasing beyond the dimensions reached by this portion at the end of the first stage.

When the second stage has been completed (FIG. 6c), the upper portion of the preform strip 10 is thus cladded downwards against the outer edge of the forming die 24 so as to form the outer wing AE of the piece to be embodied.

Even at the level of the outer wing AE, the fibers thus undergo merely an extremely limited area contraction.

The method of the invention thus causes the undulations to disappear which occur with existing methods and makes it possible to automatically form a complex shaped formed piece, whilst benefitting from the best possible mechanical properties since the deformations sustained by the fibers are also limited as far as possible.

Figure 7:
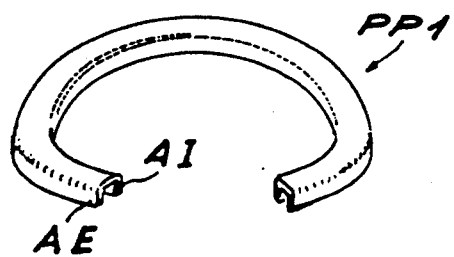
FIGS. 7 and 8 show in perspective the aspect of the piece thus obtained respectively in the case of an open frame and in the case of a closed frame, FIG. 9 diagrammatically illustrates the forming of a piece whose concavity is orientated outwardly and effected with the method of the invention.
Figure 8:
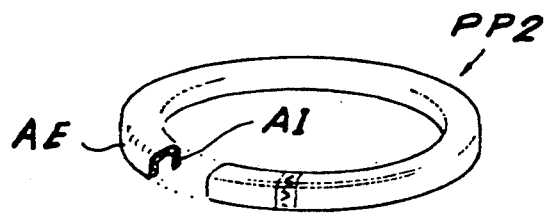

FIGS. 7 and 8 show the working of the formed pieces PP1 and PP2 obtained by applying the forming method of the invention respectively in the case of an open frame and a closed frame, these pieces having in both cases a U-shaped section comprising one internal wing AI and one external wing AE obtained as described earlier.

So as to stiffen the pieces obtained, the latter are normally placed in an oven inside which polymerization of the resin is completed.

One can readily understand that the forming method of the invention is not merely limited to the production of pieces having a U-shaped section. Thus and solely by way of example, the section of the pieces obtained may also have the shape of an L, a Z, an I, etc.

The production of a piece with an L-shaped section is embodied in a forming tool similar to the one shown on FIGS. 4a to 4c and 5a to 5c, except for the mobile hoop 28 and the external support piece 32 which may both be suppressed. Forming is then limited to placing of the upper portion P2 of the preform strip 10 on the upper face of the forming die 24 in either of the ways described with reference to FIGS. 4a to 4c and 5a to 5c. When this forming stage is completed, the entire upper portion of the preform strip 10 is folded down onto the upper face of the forming die 24 so that the piece clearly has the desired L-shaped section.

In the case where the section of the piece intended to be produced has a Z shape, the forming tool and its use are identical to those described above for the production of pieces with an L-shaped section by adding an external support piece 32. However, the width of the portion of the preform strip 10 situated above the forming die 24 is much larger than the width of the upper face of the latter. The forming operation obtained either by inflating the bladder 22 or by moving the upper plate 26 thus has the effect of cladding the upper extremity of the preform strip against the internal face of the external support piece, which clearly provides the piece with the desired Z-shaped section.

So as to obtain a piece having an I-shaped section, two symmetrical pieces are produced with a U-shaped section which are then assembled back to back.

Of course, these general section shapes exhibited by the piece obtained according to the method of the invention are merely given by way of illustration, the upper face of the forming die 24 not needing to be perfectly plain when the core of the formed piece to be embodied needs to have a section with a particular shape.

Figure 9:
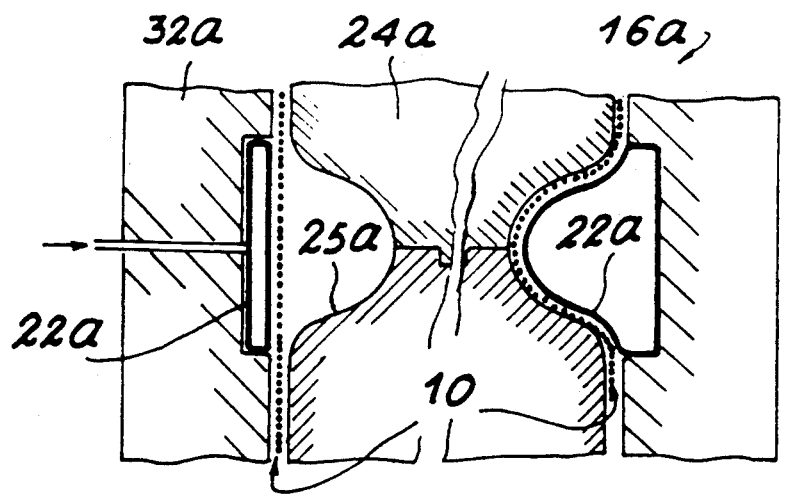

FIG. 9 diagrammatically shows a forming tool 16a making it possible to embody in accordance with the invention non-extractable convex formed pieces made of a composite material having a section with the shape whose concavity is orientated outwardly. The left and right halves of FIG. 9 show the tool 16a respectively before and after it is implemented.

This forming tool 16a includes an internal forming die 24a which has as a section a formed external surface 25a whose shape is complementary to the shape of the piece to be obtained. Around the die 24a, the preform strip 10 is initially placed in the position described previously, that is along a cylindrical surface having one rectilinear generator and one convex directrix curve which has the shape of the piece to be embodied. An inflatable bladder 22a, initially deflated, is placed around the preform strip 10 followed by an external support piece 32a, whose internal surface is a cylindrical surface complementary to the surface initially formed by the preform strip 10, with the thickness of the almost deflated bladder 22a.

In this case, forming is obtained by inflating the bladder 22a so as to clad the preform strip against the formed external surface of the forming die 24a, as shown on the right half of FIG. 9.

So as to embody a piece having such a section, each of the lateral edges of the strip 10 is maintained, either by stitching or with the aid of a strip of longitudinal fibers, before placing it into the forming tool. On the other hand, at least one of these lateral edges is left free inside the forming tool so as to allow the fibers to be deformed in order to be cladded against the formed surface of the forming die 24a.

Figure 10:
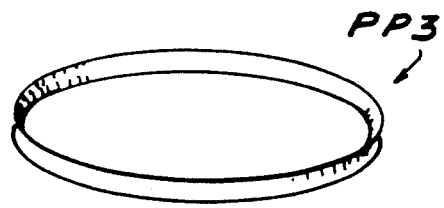
FIG. 10 is a perspective view which diagrammatically illustrates a closed frame obtained with the forming tool of FIG. 9.

At the end of forming, a formed piece is obtained which may in particular assume the shape of an open frame or a closed frame, such as the one shown at PP3 on FIG. 10. This section of this frame has the shape whose concavity is orientated outwardly.

In order to produce a formed piece with a section having the shape whose concavity is orientated inwardly, a forming tool 16b (FIG. 11) is used similar to the one described above with reference to FIG. 9 but in which the shapes presented by the surfaces in relation to the pieces 24a and 32a are inverted.

Figure 11:
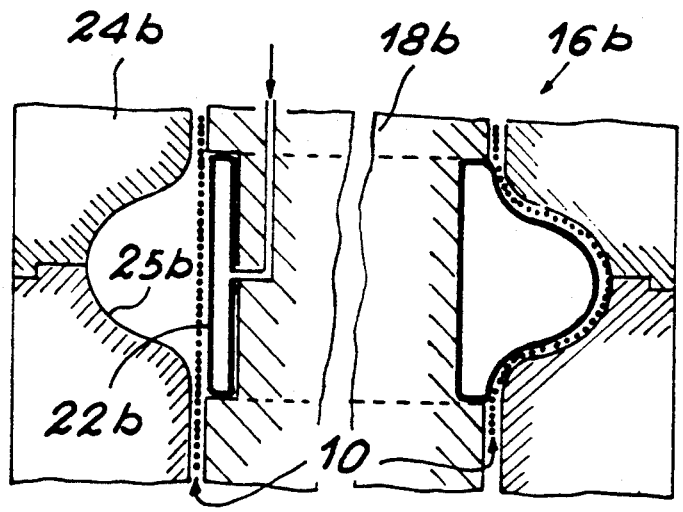
FIG. 11 is a view similar to FIG. 9 illustrating the forming of a piece with a -shaped section and whose concavity is orientated inwardly.

More precisely, FIG. 11 shows that the tool 16b includes an internal support piece 18b which has an external cylindrical surface having one rectilinear generator and one convex directrix curve which corresponds, having almost the thickness of the inflatable bladder 22b, to the convex directrix curve formed by the preform strip 10 when the latter is placed in the tool. The tool 16b further includes a forming die 24b whose formed internal surface 25b is complementary to the external surface of the piece to be embodied.

The production of the piece is moreover identical to the one described previously with reference to FIG. 9, that is forming is obtained directly by inflating the bladder 22b placed between the support piece 18b and the preform strip 10, as shown on the right half of FIG. 11.

Figure 12:
FIG. 12 is a perspective view representing a closed frame obtained with the tool of FIG. 11.

FIG. 12 represents the formed piece PP4 obtained at the end of forming effected with the aid of the forming tool 16b of FIG. 11.

Of course, in order to produce pieces having different sections, the forming tool shall be adapted to this section without departing from the context of the invention.

It is also to be noted that if the use of one or several inflatable bladders constitutes one particularly advantageous solution to implement the forming method of the invention, this solution must not be regarded is restrictive. In fact, the forming method of the invention rests essentially on the use of the aptitude of the preimpregnated fibrous laps, preferably formed of crossed fibers but not limitatively, more or less, for deforming when they are subjected to pressures perpendicular to their surfaces. These pressures enabling the preform strip initially placed along a cylindrical surface to be shaped may therefore be obtained by any device and in particular by means of rolling or by directly exerting a pneumatic pressure on the preform strip.

As already mentioned, the forming method of the invention, as opposed to existing methods, makes it possible to obtain quickly, simply, and possibly in automated fashion, all non-extractable convex formed pieces made of a composite material by only carrying out initially on the preform strip those deformations strictly required for forming. In particular, this makes it possible to suppress any singeing of fibers, this singeing originating from undulations, and results in the stratified pieces obtained in the loss of all the stiffness and resistance characteristics of the fibers.

It shall also be observed that implementation of the method of the invention may be effected either continuously or discontinuously and that the forming tool may include heating means so as to increase the rate of production.

What is claimed is:

1. A method for forming a non-extractable formed piece made of composite material from a flat preform strip including fibers preimpregnated with resin and orientated along at least two different non-longitudinal directions, the method comprising the steps of:

placing the preform strip in a forming tool along a cylindrical surface having one rectilinear generator and one convex directrix curve which has the shape of the piece to be formed, said tool including a forming die having a formed surface which has a section complementary to the piece to be formed;

applying a central portion of the preform strip against the formed surface of the forming die, by means of an inflatable bladder placed on the side of the preform strip with respect to the formed surface opposite said central portion;

forming an outer portion of the piece by moving a mobile hoop of the forming tool substantially parallel to said rectilinear generator, whereby said outer portion slides along said mobile hoop and is returned against the formed surface; and solidifying the resin.

2. Method according to claim 1, wherein the preform strip is applied against the formed surface by inflating the inflatable bladder.

3. Method according to claim 1, wherein the applying step is performed after inflating the inflatable bladder by moving a mobile member of the forming tool in order to deform said bladder.

4. Method according to claim 1, wherein the preform strip is compacted before being placed in the forming tool.

5. Method according to claim 1, wherein, the piece to be formed is a closed frame, two extremities of the preform strip are interconnected by at least one seam before placing said strip in the forming tool.

6. Method according to claim 1, wherein, the preform strip includes at least one portion not to be deformed said at least one portion being maintained by mechanical clamping in the forming tool when applying the preform strip against the formed surface.

7. Method according to claim 1, wherein, the preform strip includes at least one portion not to be deformed, at least one longitudinal seam is made on said at least one portion before placing the preform strip in the forming tool.

8. Method according to claim 1, wherein, the preform includes at least one portion not to be deformed said at least one portion being reinforced by means of at least one lap of fibers orientated longitudinally with respect to the preform strip before placing the preform strip in the forming tool.

9. Method according to claim 6, wherein said at least one portion of the preform strip not to be deformed corresponds to an internal portion of the piece to be formed, the preform strip being applied outwardly against the formed surface of the forming die.

* * * * *